United States Patent
Wako

(10) Patent No.: US 9,703,472 B2
(45) Date of Patent: Jul. 11, 2017

(54) METHOD AND SYSTEM FOR OPERATING CONSOLE WITH TOUCH SCREEN

(71) Applicant: Alpine Electronics, Inc., Tokyo (JP)

(72) Inventor: Hikaru P. Wako, Torrance, CA (US)

(73) Assignee: Alpine Electronics, Inc., Tokyo (JP)

( * ) Notice: Subject to any disclaimer, the term of this patent is extended or adjusted under 35 U.S.C. 154(b) by 114 days.

(21) Appl. No.: 14/661,967

(22) Filed: Mar. 18, 2015

(65) Prior Publication Data
US 2016/0274717 A1    Sep. 22, 2016

(51) Int. Cl.
G06F 3/041    (2006.01)
G06F 3/0488   (2013.01)

(52) U.S. Cl.
CPC .......... G06F 3/0488 (2013.01); *G06F 3/0414* (2013.01); *G06F 2203/04101* (2013.01); *G06F 2203/04105* (2013.01); *G06F 2203/04106* (2013.01)

(58) Field of Classification Search
CPC ........... G06F 3/014; G06F 2203/04105; G06F 3/0488; B60W 2540/00; B60W 50/08
USPC ........................................................ 345/156
See application file for complete search history.

(56) References Cited

U.S. PATENT DOCUMENTS 8,587,542 B2    11/2013  Moore
2006/0279528 A1*  12/2006  Schobben .............. B60K 35/00
                                                345/156
2010/0141574 A1*  6/2010  Jung ..................... G06F 3/0346
                                                345/156
2013/0265221 A1*  10/2013  Lee .......................... G06F 3/01
                                                345/156
2014/0028601 A1    1/2014  Moore
2014/0225833 A1*   8/2014  Yen ..................... G06F 3/03543
                                                345/163

FOREIGN PATENT DOCUMENTS

JP    2009-163363    7/2009
JP    2012-242924    12/2012
JP    2013-080364    5/2013

* cited by examiner

*Primary Examiner* — Abbas Abdulselam
(74) *Attorney, Agent, or Firm* — Muramatsu & Associates

(57) ABSTRACT

An infotainment system in a vehicle including a central processing unit (CPU), one or more memory units, a console including a touch screen having a screen, a touch sensor integrally attached to the screen for receiving a touching operation of a user, and a pressure sensor attached to the screen for receiving a pressing operation of the user, and a graphical user interface module that processes display contents and to instruct the screen to display the display contents is provided. Depending on whether to activate either the touch sensor or the pressure sensor or both in order to receive an entry from a user is determined, based on current vehicle situation, graphic contents according to the determined sensors may be displayed, the determined sensors may be activated, and the entry from the user may be received at the activated one or more sensors.

18 Claims, 13 Drawing Sheets

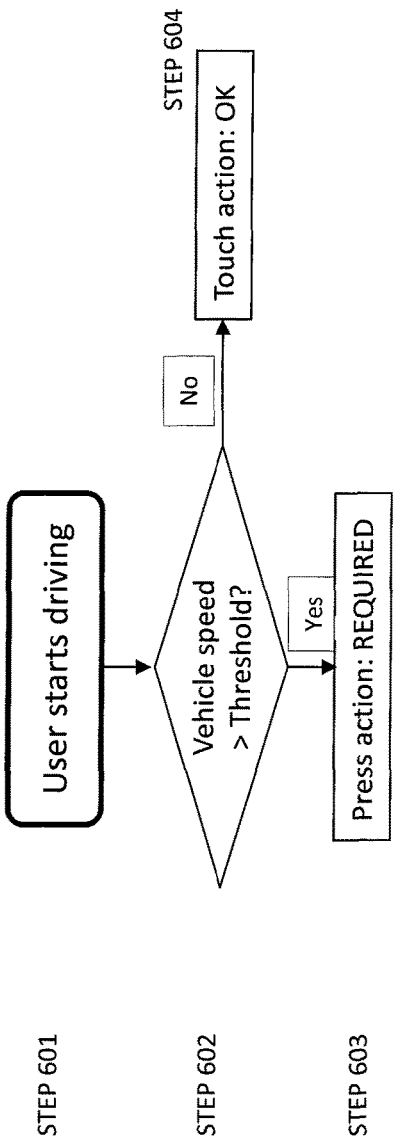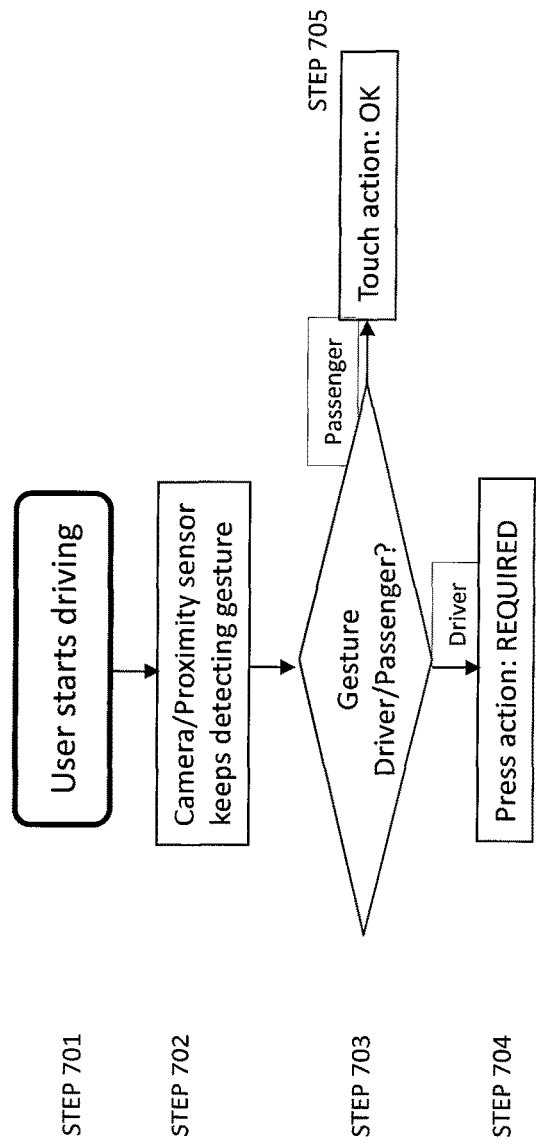
FIG. 6
FIG. 7

METHOD AND SYSTEM FOR OPERATING CONSOLE WITH TOUCH SCREEN

BACKGROUND

1. Field

The present disclosure relates to a method and system for operating a console with a touch screen. More specifically, embodiments in the present disclosure relate to a method and system for operating a console in a vehicle with a touch screen such that the touch screen employs a plurality of reception modes of user gesture on the touch screen depending on a condition of the vehicle, in order to provide secure, intuitive and friendly gesture guidance while preventing driver distraction.

2. Description of the Related Art

While a driver is driving a vehicle, it is not easy for the user to touch a screen of an infotainment system in the vehicle and control the infotainment system as intended, due to instability and vibration in the vehicle. This operation often requires a driver's eyes off the road and this may lead to the driver distraction, which is dangerous for driving. A touch screen with high sensitivity, such as a capacitive type used for portable devices, tends to be less suitable for in-vehicle applications because it is difficult to prevent unintended gesture operations due to its high sensitivity.

For this reason, an in-vehicle system that employs a less sensitive touch screen, such as a resistive type, which requires user's pressing down operations, have been employed for a touch screen in a vehicle. However, a screen view of the resistive type of touch screen typically has poorer contrast which brings difficulty in visibility of items on the in-vehicle touch screen. In addition, when a vehicle is parking, less sensitivity of the resistive type touch screen may frustrate a driver who wishes to obtain quick and prompt responses from the in-vehicle system.

Thus, it would be more favorable, if the driver can have access to an input device, such as a touch screen, for the infotainment system which allows the user to ensure her/his operations on the interface by pressing down entry and non-visual (e.g. voice, haptic) feedback while driving or in a more hazardous condition and to enter operations such as swipe, pinch, tap, etc. and to receive quick responses on the interface like a smartphone or a tablet which many drivers have been already familiar with while parking or in a less hazardous condition.

Accordingly, there is a need to provide a method and system that allows a user to easily operate the infotainment system in the vehicle with a touch screen, for achieving ensured entries along with driving operations while removing stress and frustration of slow entries in static operations.

SUMMARY

In one aspect, an infotainment system in a vehicle including a central processing unit (CPU), one or more memory units, a console including a touch screen having a screen, a first sensor integrally attached to the screen and receives a touching operation of a user, and a second sensor attached to the screen and receives a pressing operation of the user, and a graphical user interface module configured to process display contents and to instruct the screen to display the display contents is provided. The CPU determines whether to activate either the first sensor or the second sensor or both in order to receive an entry from a user, displays contents according to the determined one or more sensors, activates the determined one or more sensors, and receives the entry from the user at the activated one or more sensors.

In another aspect, a method for operating a console with a touch screen of an infotainment system in a vehicle is provided. The method includes determining whether to activate either the first sensor for receiving a touching operation or the second sensor for receiving a pressing operation or both in order to receive an entry from a user, processing display contents according to the determined one or more sensors, activating the determined one or more sensors, instructing the touch screen to display the display contents, and receiving the entry from the user at the activated one or more sensors.

In one embodiment, the CPU determines whether the current driving situation is hazardous. If the current driving situation is determined hazardous, the CPU enables the second sensor to determine that the entry is valid when the second sensor receives the press operation at the entry.

In one embodiment, the CPU determines whether the vehicle is in motion by a status of one of a vehicle speed, a gear selector's position, a parking brake, an angle of a steering wheel, and an engine on/off status. When the CPU determines that the vehicle is in motion, the CPU determines that the current driving situation is hazardous.

In one embodiment, a navigation program may be executed and predicts whether the vehicle is approaching a next maneuver within a predetermined time or distance. When the vehicle is predicted to be approaching the next maneuver within the predetermined time or distance, the current driving situation is determined as hazardous. Furthermore, a degree of complexity of the maneuver may be predicted, and the predetermined time and distance may be adjusted according to the predicted degree of complexity of the maneuver.

In one embodiment, one or more third sensors detects whether a body part is approaching the touch screen. When the one or more third sensor detects that the body part is approaching the touch screen, whether the body part belongs to a driver is determined using a result of detection by the one or more third sensors. If it is determined that the body part belongs to the driver, the second sensor is enabled. The CPU determines that the entry is valid when the second sensor receives the press operation at the entry. The one or more third sensors may be proximity sensors or cameras.

In another embodiment, the touch screen includes a first region for accepting a touching operation as the user entry and a second region for accepting a pressing operation as the user entry. In this embodiment, the touch screen displays the first region and the second region in graphically different manners. Furthermore, it is possible that the touch screen displays the second region comprising one or more buttons indicative that they accept pressing operations of the user.

The above and other aspects, objects and advantages may best be understood from the following detailed discussion of the embodiments.

BRIEF DESCRIPTION OF THE DRAWINGS

FIG. 6 is a flow chart of providing a touch screen of an infotainment console in a vehicle, according to one embodiment.

FIG. 7 is a flow chart of providing a touch screen of an infotainment console in a vehicle, according to one embodiment.

DETAILED DESCRIPTION OF THE PREFERRED EMBODIMENTS

Various embodiments for a method and system for operating a console with a touch screen will be described hereinafter with reference to the accompanying drawings. Unless defined otherwise, all technical and scientific terms used herein have the same meaning as commonly understood to one of ordinary skill in the art to which present disclosure belongs. Although the description will be made mainly for the case where a method and system for operating a console with a touch screen, any methods, devices and materials similar or equivalent to those described, can be used in the practice or testing of the embodiments. All publications mentioned are incorporated by reference for the purpose of describing and disclosing, for example, the designs and methodologies that are described in the publications which might be used in connection with the presently described embodiments. The publications listed or discussed above, below and throughout the text are provided solely for their disclosure prior to the filing date of the present disclosure. Nothing herein is to be construed as an admission that the inventors are not entitled to antedate such disclosure by virtue of prior publications.

In general, various embodiments of the present disclosure are related to a method and system for operating a console with a touch screen. Furthermore, the embodiments are related to a method and system for operating a console in a vehicle with a touch screen such that the touch screen employs a plurality of reception modes of user gesture on the touch screen depending on a condition of the vehicle, in order to provide secure, intuitive and friendly gesture guidance while preventing a user from driver distraction.

Figure 1:
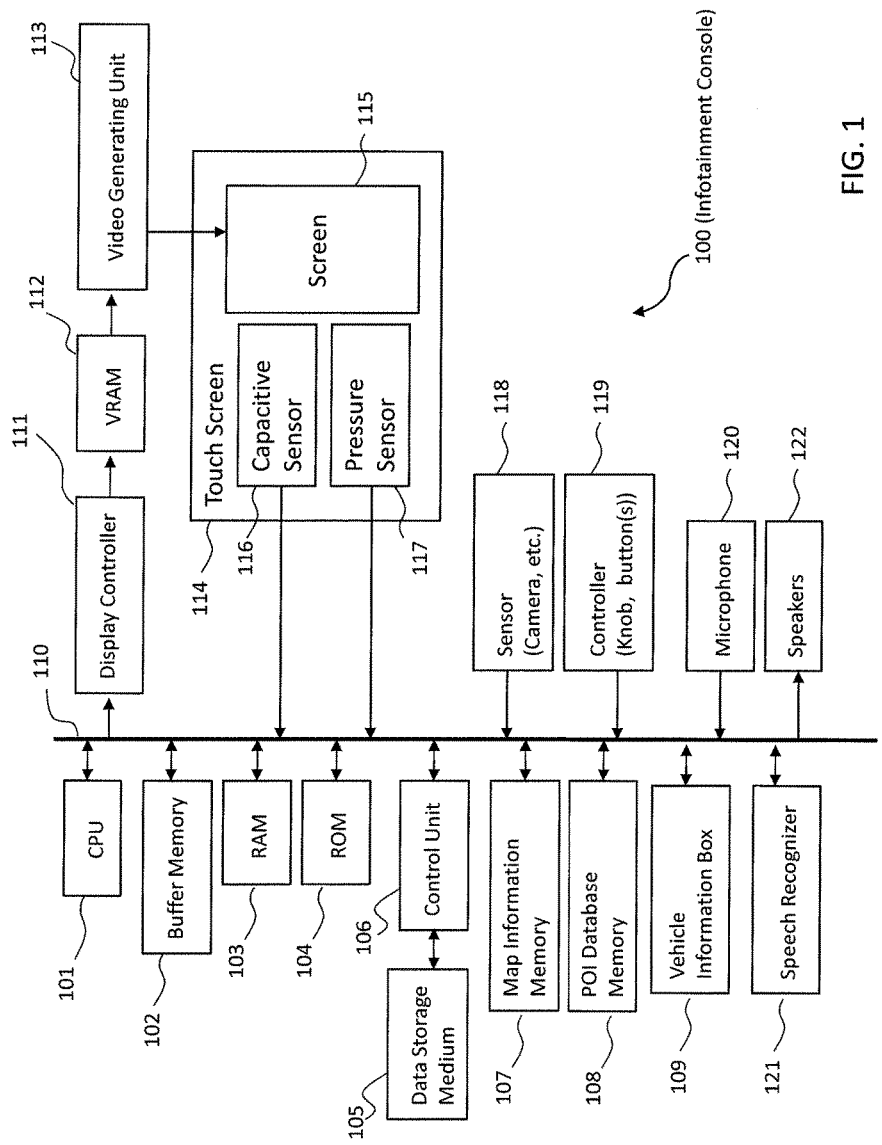
FIG. 1 is a block diagram of a touch screen of an infotainment console in a vehicle, according to one embodiment.

FIG. 1 is a block diagram of an infotainment console in a vehicle that executes a method and system for operating a console with a touch screen according to one embodiment. Note that the block diagram in FIG. 1 is merely an example according to one embodiment for an illustration purpose and not intended to represent any one particular architectural arrangement. The various embodiments can be applied to other types of infotainment system. For example, a vehicle infotainment console 100 includes a central processor unit (CPU) 101 for controlling an overall operation of the infotainment console 100, a buffer memory 102 for temporally storing data such as a current user interface related data for efficient handling user inputs in accordance with this disclosure, a random access memory (RAM) 103 for storing a processing result, and a read only memory (ROM) 104 for storing various control programs, such as a user interface control program and an audio visual media and navigation control program, necessary for infotainment system control of this disclosure.

The infotainment console 100 may also includes a data storage medium 105 such as a hard disk in a hard disk drive (HDD), a flash memory in a solid state drive (SSD) or a universal serial bus (USB) key memory, a compact disc-read only memory (CD-ROM), a digital versatile disc (DVD) or other storage medium for storing navigation and entertainment contents such as map information, music, video etc. The infotainment console 100 may also include a control unit 106 for controlling an operation for reading the information from the data storage medium 105. The infotainment console 100 may include or have access to a vehicle information box 109 in a vehicle and either inside or at proximity of the infotainment console 100, including a position/distance measuring device for measuring a present vehicle position or user position and storing other vehicle condition related statuses, such as a fuel level, tire status, climate controller (heating, ventilating, and air conditioning: HVAC), etc., available via a vehicle bus, such as a controller area network (CAN) bus. For example, the position measuring device in the vehicle information box 109 has a vehicle speed sensor for detecting a moving distance, a gyroscope for detecting moving direction, a microprocessor for calculating a position, a global positioning system (GPS) for receiving and analyzing GPS signals, etc., and each connected by a system internal bus system 110.

The infotainment console 100 further includes a map information memory 107 for storing a portion of the map data relevant to ongoing operations of the infotainment console 100 which is read from the data storage medium 105, a point of interest (POI) database memory 108 for storing database information such as POI information which is read out from the data storage medium 105.

Figure 2:
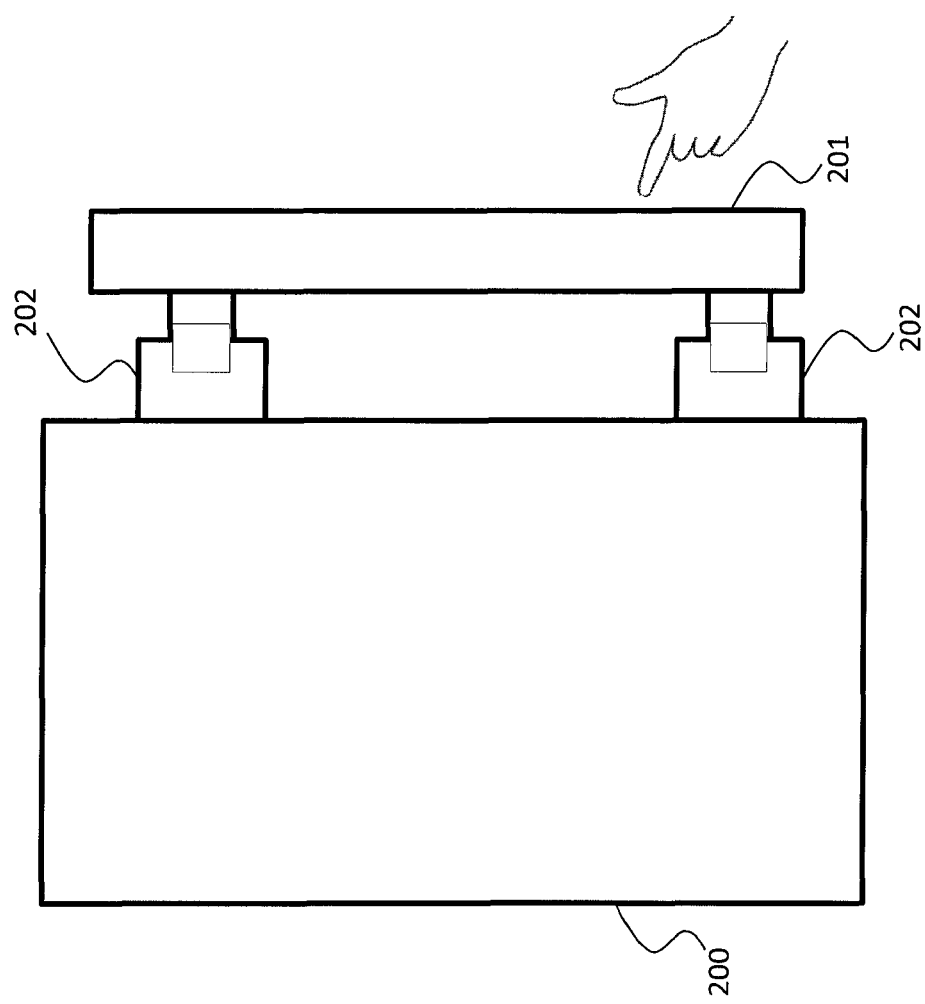
FIG. 2 is a schematic diagram of an infotainment console in a vehicle, according to one embodiment.

The infotainment console 100 accommodates a plurality of means for receiving user inputs. For example, the infotainment console 100 may include a touch screen 114 for detecting a touch entry by the user. Here, the touch screen is able to accommodate a plurality of levels of user contact of the touch screen. In one embodiment, the touch screen 114 contains a screen 115, a capacitive sensor 116 integrally attached to a surface of the screen 115, one or more pressure sensors 117 attached to a back side of the screen 115, opposite to the surface side of the screen 115. FIG. 2 is a structural example of the embodiment which illustrates positional relationships among these components of the touch screen. For example, the plurality of pressure sensors 202 are located on a console frame 203 of the infotainment console 200, in a manner to support a capacitive touch screen 201 which integrally includes the capacitive sensor 116 and the screen 115. Note that this mechanism is merely an example according to one embodiment for an illustration purpose and not intended to represent any one particular architectural arrangement. The various embodiments can be applied to other types of infotainment system which are able to detect user contacts of a plurality of levels. In fact, it is possible to use other combinations of components to achieve detection of user contacts of a plurality of levels by having a combination of a capacitive touch screen and a resistive touch screen, for example.

Alternatively, as seen in a traditional vehicle entertainment system, input controllers 119 such as knobs and buttons may be included in the infotainment console 100 for accommodating entries by a user. To accommodate hands-free input operation to minimize driver distraction, it may be appropriate to use voice commands as user inputs for the infotainment console 100. To accommodate such voice commands, a microphone 120 for receiving speech input may be included. Once a voice command is received at the microphone 120, the voice command is sent to a speech recognizer 121 to be matched with any speech pattern associated with infotainment related vocabulary in a speech database and the matched speech pattern is interpreted as a voice command input from the user. Alternatively, the voice command may be transmitted to a speech server outside of this system for recognition processing.

The vehicle infotainment console 100 may also include a plurality of means to output an interactive result of user input operations. For example, the infotainment console 100 may include a display controller 111 for generating images, such as radio preset table images, as well as menu related images related to the infotainment console control information and some of these generated images may be stored in a video RAM (VRAM) 112. The images stored in the VRAM 116 are sent to a video generating unit 113 where the images are converted to an appropriate format to be displayed on the screen 115 which may present a natural view as an interface to a user. Upon the receipt of video data, the screen 115 displays the image. Alternatively, to keep eyes of a driving user on a road rather than prompting the driving user to look in to the screen, the interactive output may be presented to the driving user as audio feedback via one or more speakers 122.

The bus system 110 may include one or more busses connected to each other through various adapters, controllers, connectors, etc. and the devices and units of the infotainment console 100 mentioned above may be coupled to each other via the bus system 110.

The CPU 101 controls an overall operation of the infotainment console 100 including receiving entries of a user, processing the entries, displaying interaction to the user accordingly, selecting a content or control item from either a medium, a connected device, or a broadcast signal and presenting the content or control item to the user. User commands received from input devices are processed by the CPU 101 in order to determine the next action.

While a user is driving and the vehicle is moving, it is not easy for the user to touch the touch screen 114 and control the infotainment console 100 as intended, due to instability and vibration in the vehicle. Thus, it would be more favorable, if the user can have access to an input device for the infotainment console 100 which has an interface that the user is already familiar, while being able to receive an ensuring gesture action if necessary. In one embodiment, a capacitive touch screen may be able to provide an interface familiar to a user because the capacitive touch screen is typically used in smartphones and tablets. According to one embodiment, the touch screen 201 may be placed on the infotainment console 200 also having pressure sensors 202 in between as shown in FIG. 2. With this structure, it is possible to detect touch gesture actions by the touch screen 201 while it is possible to detect press gesture action by identifying a location of a user contact by the touch screen 201 and by detecting pressure from the user contact by the pressure sensors 202.

By having a plurality of contact levels for a touch screen, it is possible for an infotainment console to provide a plurality of different 'Select' definitions to user (driver), dependent on the condition such as parking and driving. For example, while in a less hazardous condition, a capacitive touch screen is able to react to a user's action such as "releasing from the screen", which provides freedom of access to a familiar user interface like smartphones and tablets as stated above. On the other hand, while in a more hazardous condition, interactions via the capacitive touch screen can be confirmed with actions with pressure sensors and reactions limited to a user's action such as "pressing the screen" can be provided. This arrangement ensures user operations and thus reduces operation errors and increases safety.

For example, a user can fully focus on touch operations while a vehicle is being parked. The user may have higher expectation for freedom of smooth interface like smartphone/tablet where the user can operate items in the touch screen by gestures as swipe, pinch, tap and etc. On the other hand, during driving, the user who is driving may need more reliable and safe operations by physical pressing followed by voice or haptic feedback etc., because the operating hand may not always be stable due to vibration and the user may not be able to freely look at the screen because the user needs to keep eyes on a road. Thus, it is beneficial to have the system which is able to automatically assign the 'Select' definition by switching touch and press detection schemes based on the hazard conditions.

It is possible to determine whether the current vehicle condition is hazardous by several factors. For example, it is possible to determine whether a current driving situation is more hazardous or less by a vehicle speed typically represented by speed pulse information obtained from a vehicle information box 109 in FIG. 1. If the obtained vehicle speed is sufficiently low, then the vehicle is considered being parked and detection of user gesture actions via the capacitive touch screen can be processed, whereas the vehicle speed is not sufficiently low, then the vehicle is considered being in motion and detection of user gesture actions via the capacitive touch screen can processed while being accompanied with detection of the user gesture actions via the pressure sensors. Alternatively, a gear selector position can be used for determining the vehicle's hazardous status. When gear selector's position information is obtained from the vehicle information box 109, if the gear selector is in position "P", then it is considered as the vehicle is being parked whereas the gear selector in other positions can be considered as the vehicle is being operated. Similarly, a parking brake status or an engine status can be used for determining the vehicle's hazardous status. When a parking brake on/off status is obtained from the vehicle information box 109, if the parking brake is "on", then it is considered as the vehicle is being parked whereas the parking brake "off" status can be considered as the vehicle is being operated. In another way, an angle of a steering wheel may be used for determining the hazardous condition. For example, it is possible to obtain a current steering angle from a steering angle sensor (SAS) via the vehicle information box 109. If the current steering angle is beyond a threshold from an original position, either rightward or leftward, it is considered that the vehicle is in a more hazardous condition which needs the user's attention for driving, thus detection of user gesture actions via the capacitive touch screen is to be accompanied with detection of corresponding user gesture actions via the pressure sensors.

In another embodiment, an infotainment console may include one or more cameras 118 in FIG. 1 for tracking eyes movement. If a CPU 101 in the infotainment console constantly receives images from the one or more cameras 118 capturing images of eyes of a driver, processes the images for tracking eyes movement and determines that eyes of the driver is not on a road sufficiently for safe driving, it is possible to consider the current driving condition as hazardous and thus detection of user gesture actions via the capacitive touch screen is to be accompanied with detection of corresponding user gesture actions via the pressure sensors. In another embodiment, it is possible to detect road surface conditions by light or infrared emission or sensors on a tire detecting acceleration and speed in order to estimate possible roughness. If the road is considered substantially rough and thus driving is hazardous, it is possible to consider the current driving condition as hazardous and thus detection of user gesture actions via the capacitive touch screen is to be accompanied with detection of corresponding user gesture actions via the pressure sensors. Alternatively, traffic condition can be used for determining the level of hazardous condition. The traffic condition can be determined by proximity sensors to detect surrounding vehicle, a current vehicle speed possibly compared with speed limits on a map database, traffic information obtained from radio network or internet, etc. If the traffic is considered substantially busy and many more vehicles are surrounding the user's vehicle, detection of user gesture actions via the capacitive touch screen is to be accompanied with detection of corresponding user gesture actions via the pressure sensors so that the user is able to concentrate on the road for driving.

In a noisy environment, it is also difficult to pay attention to hazardous behaviors of surrounding vehicles predicted from surrounding noise. If the CPU 101 in the infotainment console receives acoustic signals from a microphone 120 in FIG. 1 and determines that the vehicle's current environment is a noisy environment, detection of user gesture actions via the capacitive touch screen may be accompanied with detection of corresponding user gesture actions via the pressure sensors so that the user who is driving is able to concentrate on the surrounding vehicles' behaviors. When a current weather condition is not good, such as raining, snowing, foggy, icy with slippery road condition etc., the user who is driving needs to focus on understanding such hazardous situation and operating the vehicle safely for the bad road condition. In this type of situation, which could be interpreted from receiving weather forecast via broadcast or internet, temperature and moist detection in the vehicle etc., detection of user gesture actions via the capacitive touch screen may also be accompanied with detection of corresponding user gesture actions via the pressure sensors. Furthermore, when a temperature of atmosphere is substantially low, (e.g. under a freezing point), not only hazardous but flexibility of gesture with body part movement may be deteriorated. For example, it is possible to obtain a current vehicle room temperature from a vehicle thermometer via the vehicle information box 109 in FIG. 1. In this type of weather condition, it may be possible to change graphical user interface which minimizes or disables "touch-only" control on a screen so that the user, regardless of a driver or a passenger, can ensure their control intent with press gesture actions.

Figure 3A:
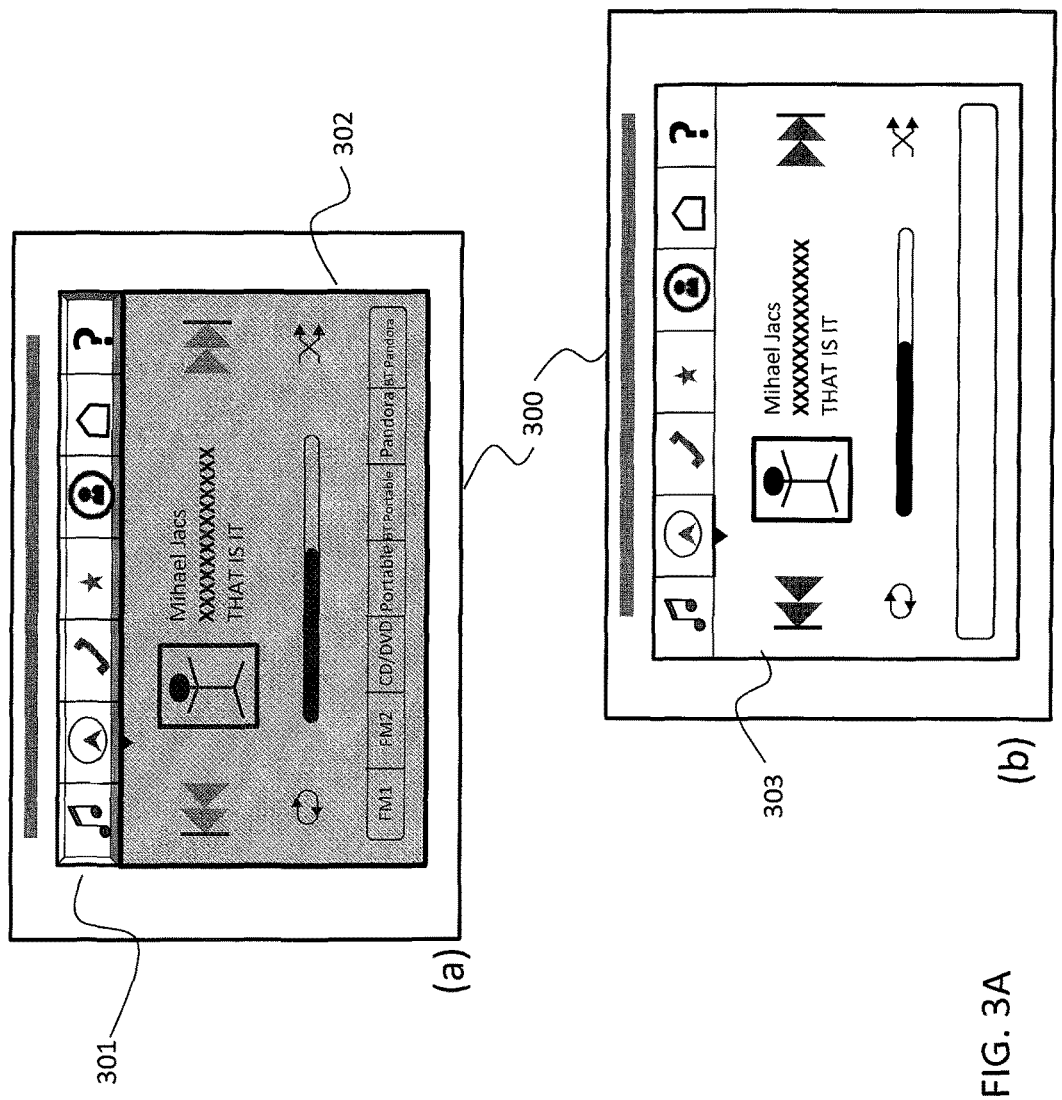
FIGS. 3A and 3B show schematic diagrams of an infotainment console in a vehicle with variations of display patterns, according to one embodiment.

Depending on a context, such as whether a vehicle is in a more hazardous situation or less hazardous situation, or whether an operator who controls the infotainment console is a driver or a passenger, etc., the infotainment console may expect a different user gesture operation such as a pressing action or a touching action. In one embodiment, the infotainment console may change regions to receive either a pressing action or a touching action depending on the context such as the hazard level or the operator. FIG. 3A shows screen samples according to expected user gesture types. For example, FIG. 3A(a) illustrates a screen sample for expecting pressing actions. In a touch screen of an infotainment console 300, when responses to touching actions are disabled, there is a press region 301 with graphics that may indicate buttons or some control items suitable for pressing actions implying that the press region 301 is designated for reception of pressing actions, in order to urge the operator to intuitively press one of the buttons. During the period while responses to touching actions are disabled, the infotainment console may grey out a touch region 302 in order to indicate that operations on the touch region 302 by touching actions are not currently available. On the other hand, when the infotainment console determines that it is acceptable to respond to touching actions and enables touch-based operations, the infotainment console may display a touch region 303 without buttons or grey out as illustrated in FIG. 3A(b) in order to indicate that touch-based operations on the touch region 303 by touching actions are currently available.

Figure 3B:
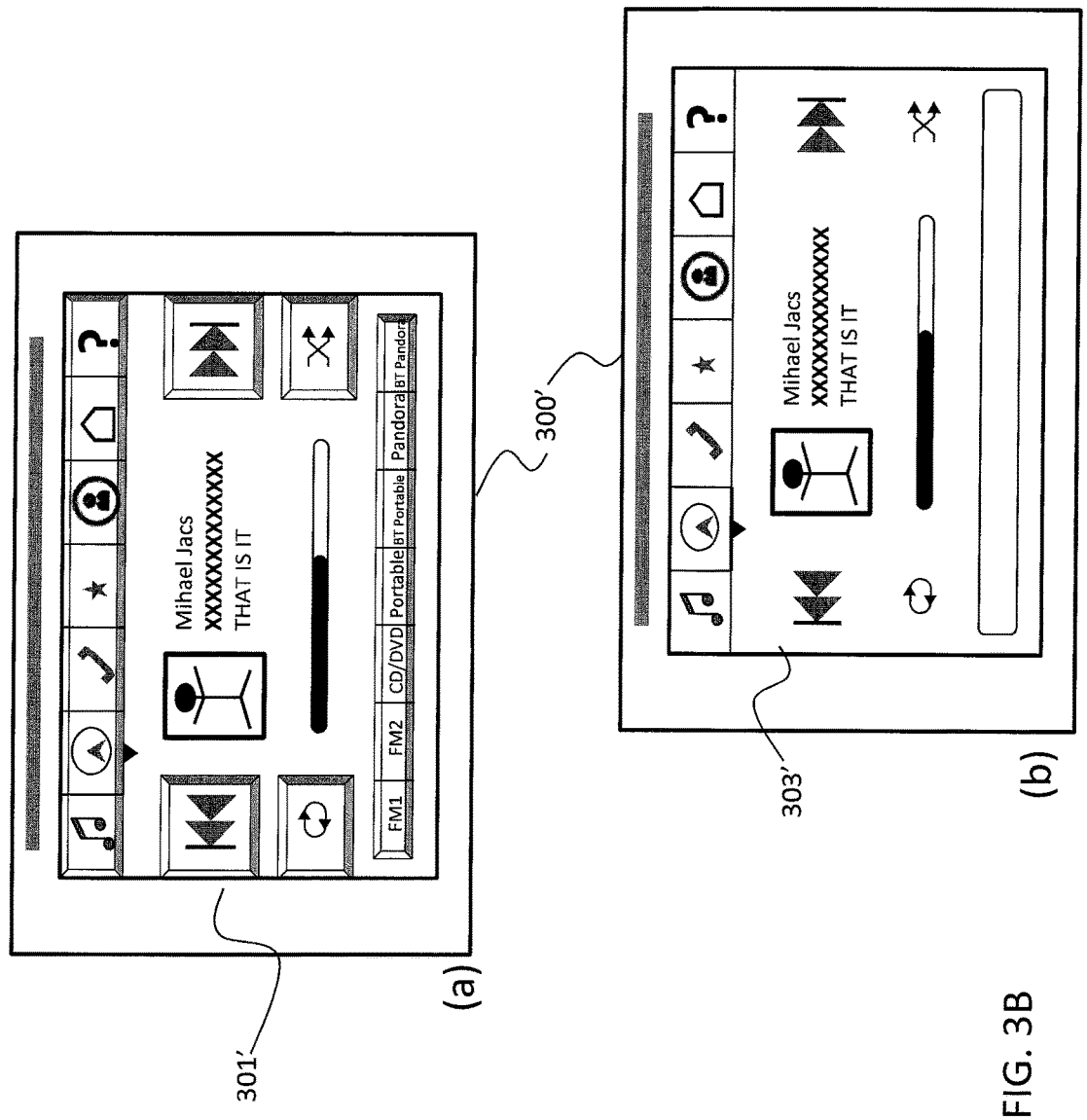

Alternatively, it is possible to have an area in a touch screen of an infotainment console 300' either designated for pressing actions or touching actions depending on the context such as the hazard level or the operator. FIG. 3B shows screen samples according to expected user gesture types. For example, FIG. 3B(a) illustrates a screen 'sample for expecting pressing actions. In a touch screen of the infotainment console 300', when responses to touching actions are disabled, the whole screen may become a press region 301' with graphics that may indicate buttons or some control items suitable for pressing actions implying that the press region 301' is designated for reception of pressing actions, in order to urge the operator to intuitively press one of the buttons. On the other hand, when the infotainment console 300' determines that it is acceptable to respond to touching actions and enables touch-based operations, the infotainment console 300' may display graphical user interface of a touch region 303' as illustrated in FIG. 3B(b) without buttons or grey out, in order to indicate that touch-based operations on the touch region 303' are currently available.

Figure 4A:
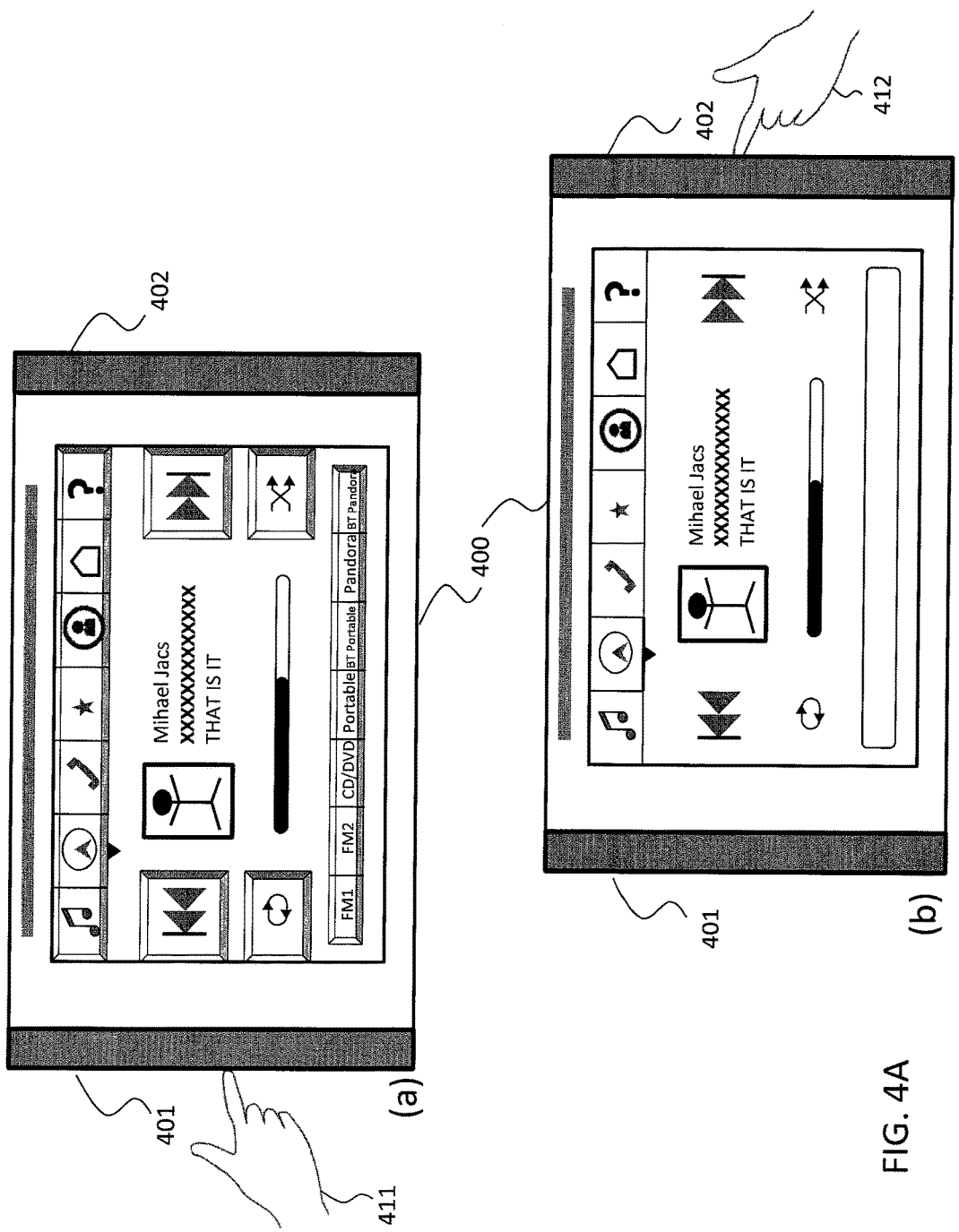
FIG. 4A shows a schematic diagram of an infotainment console in a vehicle including a combination of sensors and a screen, according to one embodiment.

In one embodiment, it is possible to detect whether an object contacting a touch screen belongs to a driver or a passenger and to determine whether detection of a user gesture action via a capacitive touch screen may be activated. For example, as illustrated in FIG. 4A, an infotainment console having a touch screen 400 may be equipped with a plurality of proximity sensors including a driver proximity sensor 401 located at a driver side of the infotainment console 400 and a passenger proximity sensor 402 located at a passenger side of the infotainment console 400. When the driver decides to operate the infotainment console 400 and a body part of the driver, such as a hand of the driver 411, moves closer to the driver side of the infotainment console 400 as shown in FIG. 4A(a), the driver proximity sensor 401 is able to detect the approach to the infotainment console 400 by the hand of the driver 411. Once the driver's approach to the infotainment console 400 is detected, the infotainment console 400 may disable detection of touching actions without pressing actions via a capacitive touch screen in order to discourage the less stable console operations using touching actions by the driver. While the touch-only actions may be disabled, one or more pressure sensors with the capacitive touch screen may still keep being active in order to accept press gesture actions of the driver that are supposed to be more stable console operations. On the other hand, if the passenger proximity sensor 402 detects approach of a hand of the passenger 412 without detection of the approach of the hand of the driver by the driver proximity sensor 401 as shown in FIG. 4A(b), it may be possible to determine that a touch gesture action following the approach is conducted by the passenger and the infotainment console 400 may keep detecting the touch gesture action by the passenger. In one embodiment, it is possible to enable detecting the press gesture action by the driver as described above, when the infotainment console 400 determines that the current driving condition is hazardous as previously stated. Once the driving condition is determined as less hazardous, such as parking condition, weather improvement, etc., it is possible to activate the capacitive touch screen for detection of touch actions by any operator, including the driver.

Figure 4B:
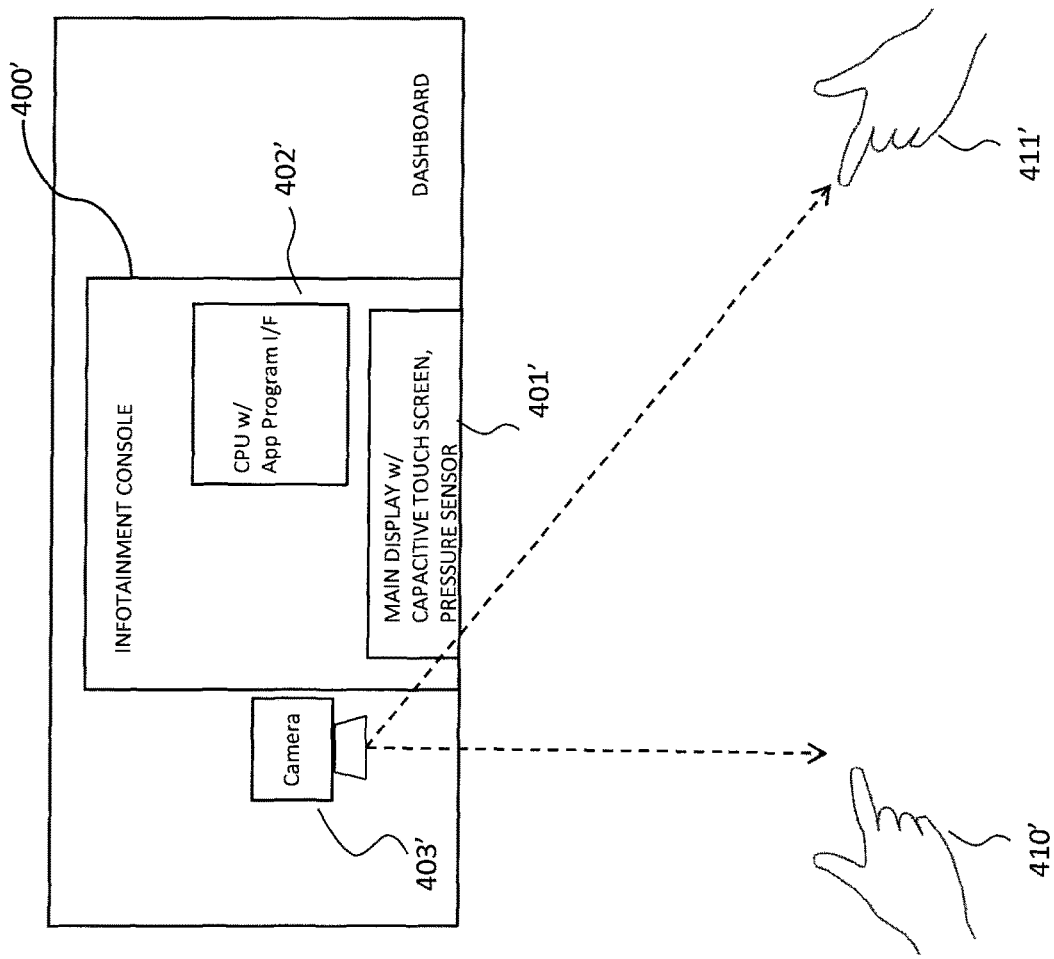
FIGS. 4B and 4C show schematic diagrams of an infotainment console in a vehicle including a camera, according to several embodiments.
Figure 4C:
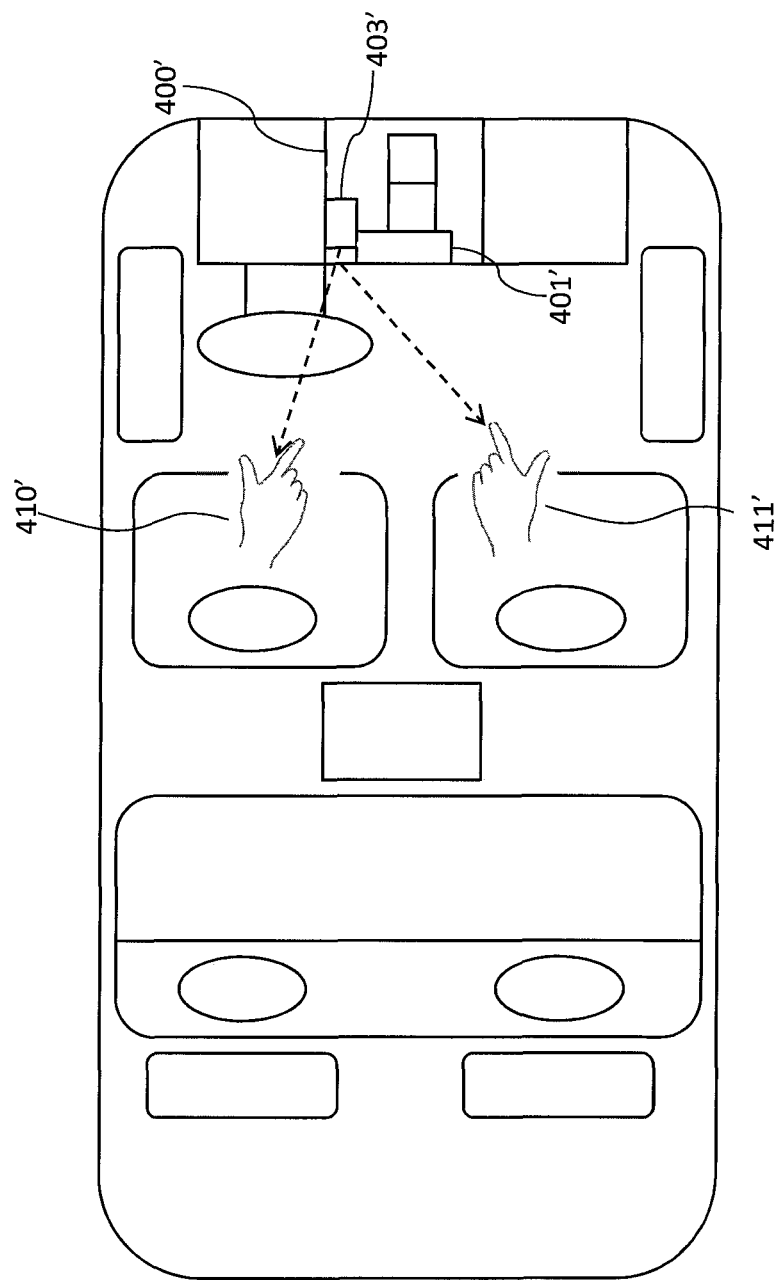

In another embodiment, it is possible to determine whether a touch gesture action is conducted by a driver or a passenger by monitoring the touch gesture action by a camera 403' or other sensor, instead of proximity sensors, as illustrated in FIGS. 4B and 4C. With the camera 403', a central processor unit (CPU) 402' of an infotainment console 400' is able to predict whether a body part approaching is the body part of a driver 410' or the body part of a passenger 411' before an actual touch operation by the body part contacting on a touch screen 401' occurs. Once the CPU 402' determines that the approaching body part is the body part of the driver 410', the CPU 402' accepts a press gesture action by detecting pressure at one or more pressure sensors of the touch screen 401' as well as by detecting a position of the press gesture action on the touch screen 401'.

Figure 5A:
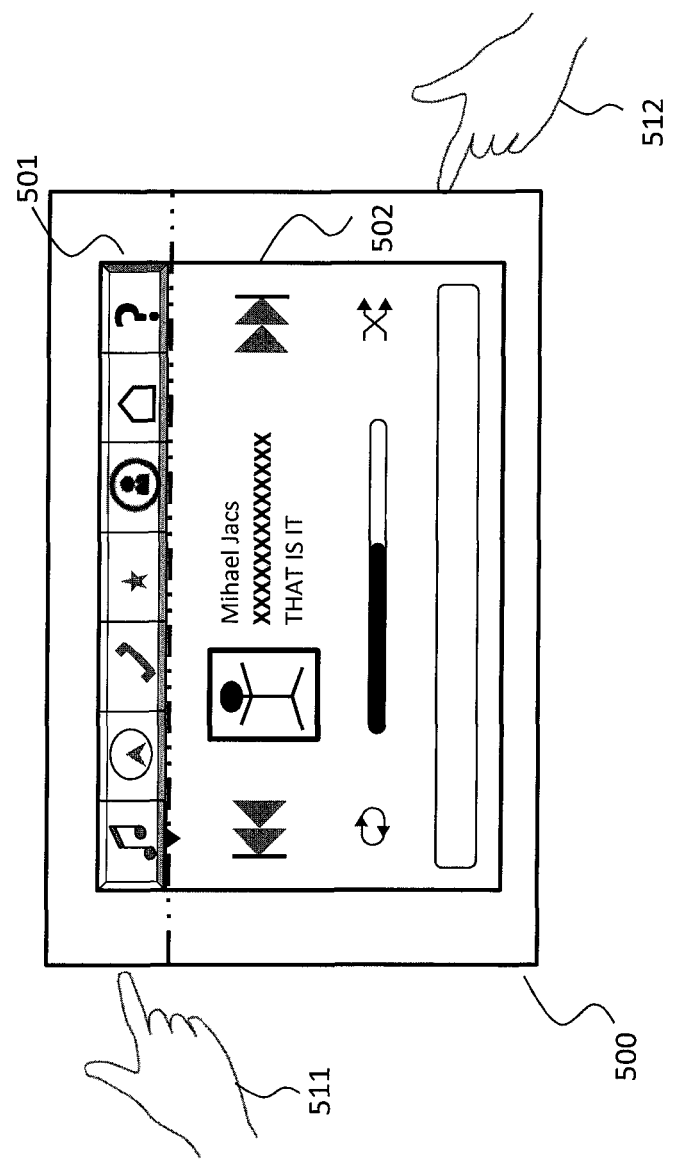
FIG. 5A shows a screen example of an infotainment console with touch control in a vehicle, according to one embodiment.
Figure 5B:
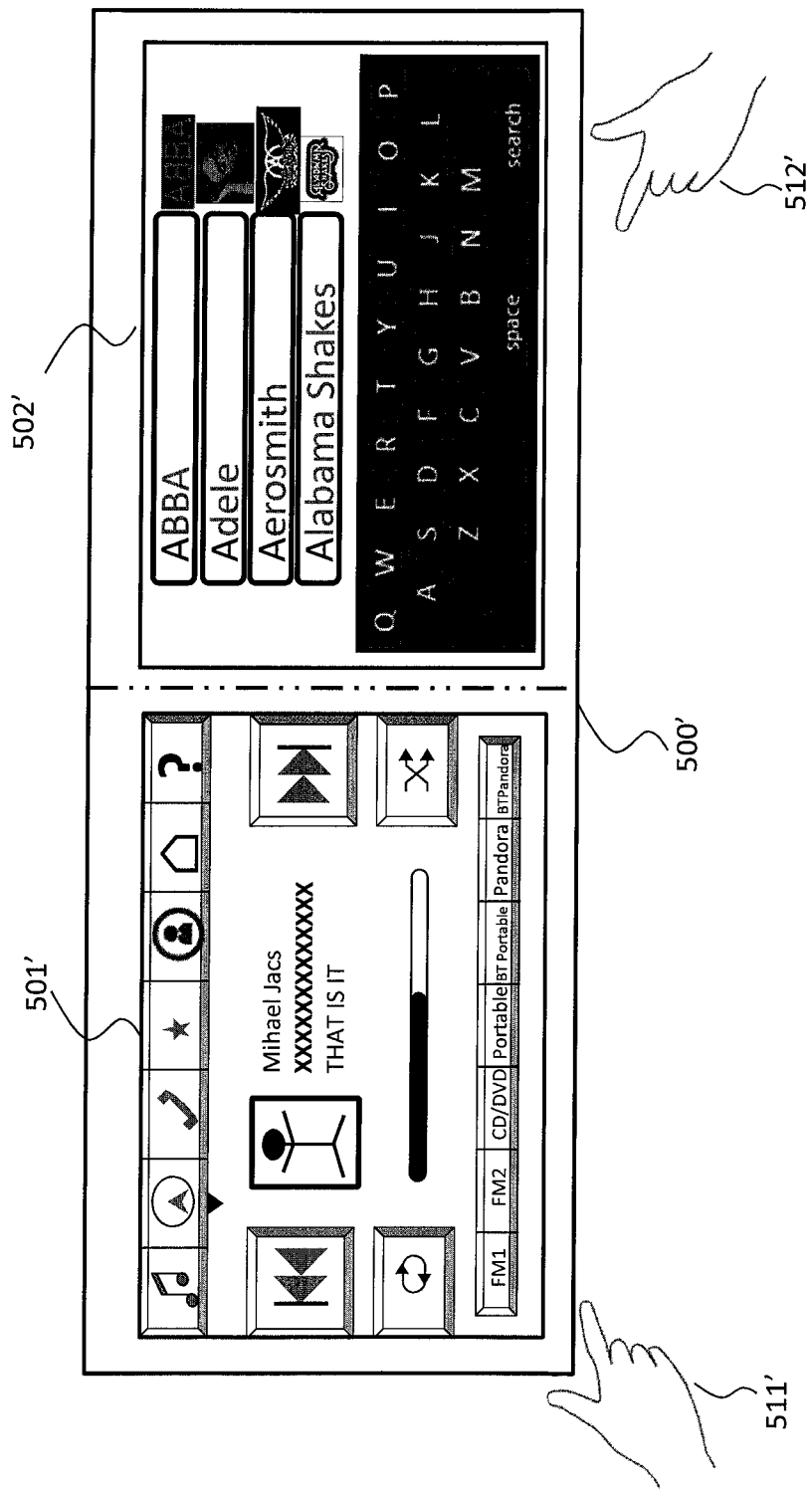
FIGS. 5B and 5C show wide screen examples of an infotainment console with touch control in a vehicle, according to several embodiments.
Figure 5C:
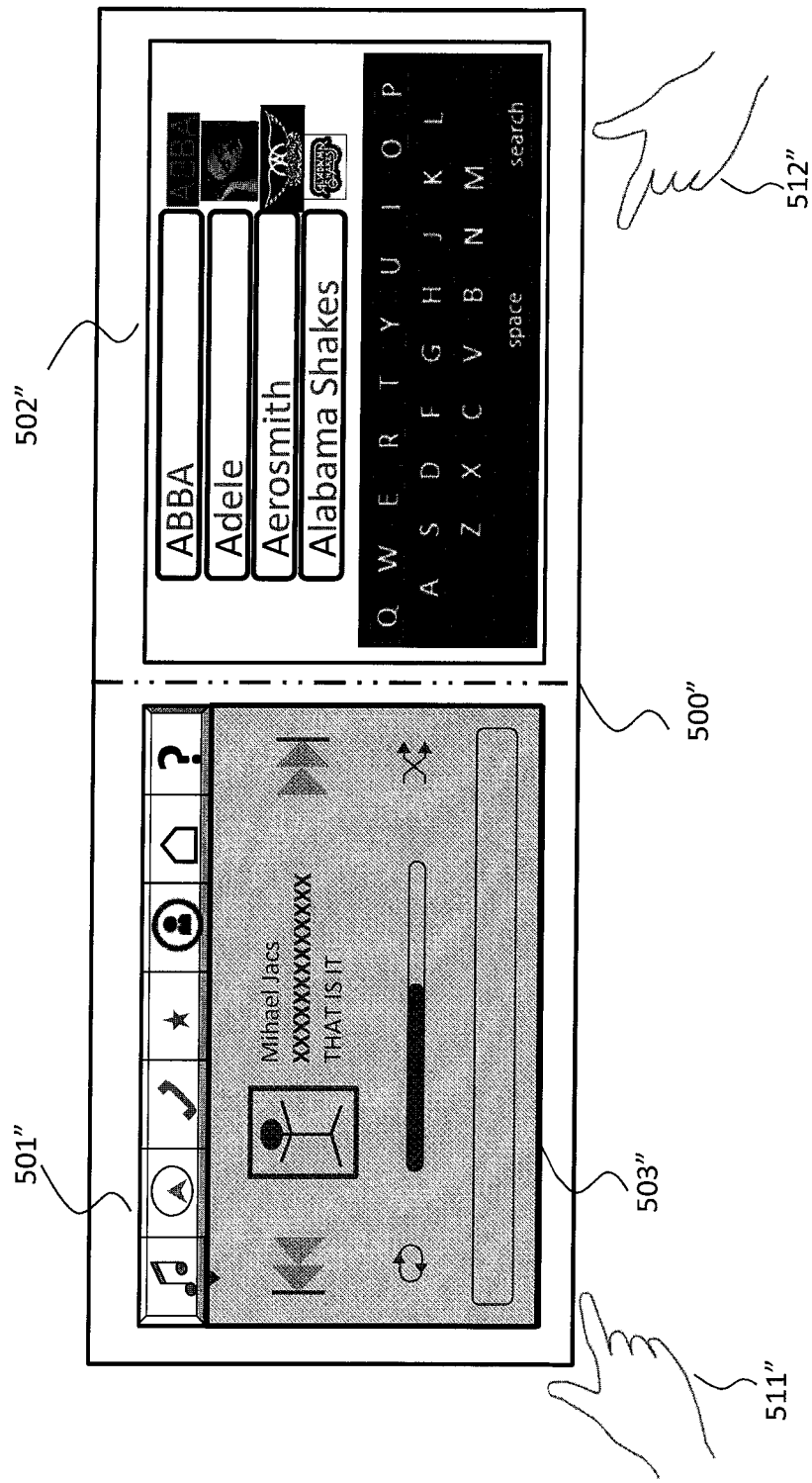

In another embodiment, touch-only operations may be limited to detailed operation of an infotainment system. FIGS. 5A, 5B and 5C illustrate examples of the infotainment system which limits touch-only operations to a certain region. For example, a touch screen 500 includes an infotainment mode switching region 501 and an audio play control region 502 as shown in FIG. 5A. The infotainment mode switching region 501 is set to react to a press gesture action by a user to press one button among a plurality of buttons corresponding with a plurality of modes of infotainment, such as audio, map, phone, setup, social network systems (SNSs), home to resume, and help because these buttons are set to receive an operation with confirmation, i.e. press gesture action. The audio play control region 502 provides a capacitive touch based interface where a user can operate several audio related functions freely by touch operation detected by a capacitive touch sensor integrally equipped on the touch screen 500.

In another embodiment, FIG. 5B shows an infotainment console with a wide touch screen 500'. This wide touch screen 500' includes two regions such as a driver control region 501' and a passenger control region 502'. For example, when a current driving condition is considered as a less hazardous condition, the wide touch screen 500' in an audio mode provides the driver control region 501' that displays relatively simple control interface such as infotainment mode switching and audio playback control function available for operation by a press gesture action by a hand of a driver 511' while also provides the passenger control region 502' that displays item search with text keys for entry available for operation by a touch gesture action of a hand of a passenger 512', possibly more complex than the simple audio control, as shown in FIG. 5B. Please note that this type of arrangement is not limited to the audio mode. In any mode, simple control functions where press gesture actions with confirmation can work sufficiently may be located on the driver control region 501' and other more complex control which may preferably be operated with touch gesture actions may be located on the passenger control region 502'.

In another embodiment, FIG. 5C shows an infotainment console with a wide touch screen 500". This wide touch screen 500" may include three regions such as a first driver control region 501", a second driver control region 503" and a passenger control region 502". For example, when a current driving condition is considered as a more hazardous condition, the wide touch screen 500" in an audio mode provides the first driver control region 501" that displays relatively simple control interface such as infotainment mode switching available for operation by a press gesture action by a hand of a driver 511" while disabling audio playback control functions displayed in the second driver control region 503" by graying out. Simultaneously, the wide touch screen 500" in an audio mode may also provide the passenger control region 502" that displays item search with text keys for entry available for operation by a touch gesture action of a hand of a passenger 512", possibly more complex than the simple audio control, as shown in FIG. 5C. Please note that this type of arrangement is not limited to the audio mode. In any mode, simple control functions where press gesture actions with confirmation can work sufficiently may be located on the first driver control region 501" and other more complex control which may preferably be operated with touch gesture actions may be located on the passenger control region 502".

Figure 5D:
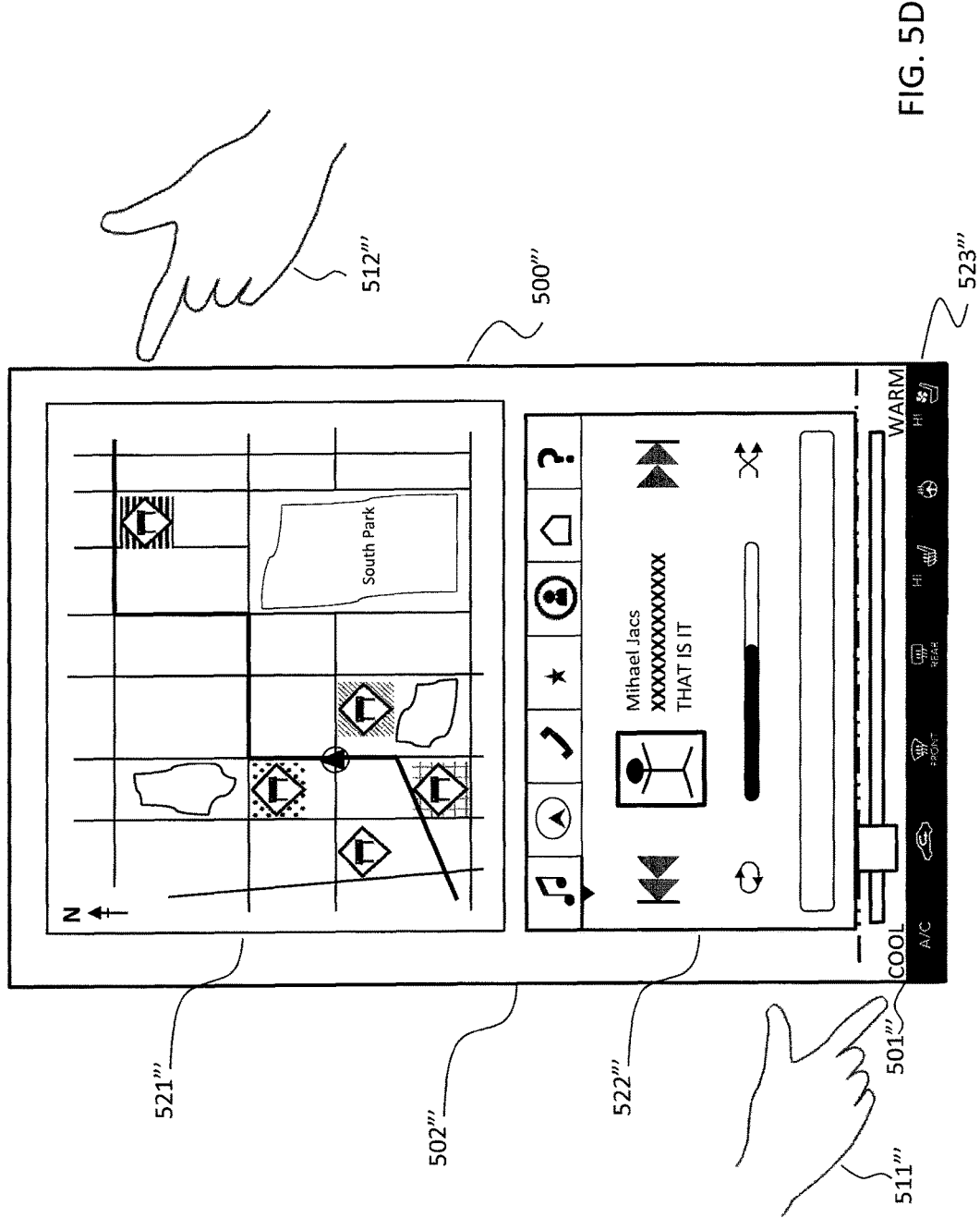
FIG. 5D shows a portrait screen example of an infotainment console with touch control in a vehicle, according to one embodiment.

In another embodiment, FIG. 5D shows an infotainment console with a portrait touch screen 500'". This portrait touch screen 500" ' includes two regions such as a press control region 501"' and a touch control region 502"'. For example, when a current driving condition is considered as a hazardous condition, the portrait touch screen 500' provides the press control region 501"' that displays relatively simple control interface such as heating, ventilation, and air conditioning (HVAC) switching available for operation by a press gesture action of a hand of a driver 511'" while also provides the touch control region 502'" that displays a navigation map 521'" and audio control 522'" available for operation by a touch gesture action of a hand of a passenger 512'", possibly more complex than the simple HVAC control, as shown in FIG. 5C. Please note that this type of arrangement is not limited to a combination of the map, the audio control and the HVAC control. In any mode, simple control functions where press gesture actions with confirmation can work sufficiently may be located on the press control region 501'" and other more complex control which may preferably be operated with touch gesture actions may be located on the touch control region 502'".

FIG. 6 is a one sample flow chart of a procedure of the method of operating a console with a touch screen according to one embodiment. In step S601, a user starts driving. In step S602, the system checks whether a current vehicle speed exceeds a threshold speed. The current vehicle speed can be determined from many ways, such as speed pulses of the vehicle, progress in Global Positioning System signals, etc. The threshold can be determined based on performance of the vehicle, a speed limit of a road including a current vehicle position, a current traffic condition, etc. If the current vehicle speed exceeds the threshold speed, a pressure sensor of the touch screen is activated in addition to a capacitive sensor of the touch screen, as shown in step S603. If the current vehicle speed does not exceed the threshold speed, sensing user's touch operations is enabled, as shown in step S604. In this example, a device for detecting a user's press gesture action is a pressure sensor, but it is not limited to the pressure sensor. Please note that any sensing device, such as a resistive type of displays, etc., that can accomplish the similar procedure may be used for this purpose.

FIG. 7 is another sample flow chart of a procedure of the method of operating a console with a touch screen according to one embodiment. In step S701, a user starts driving. In step S702, one or more sensors may start detecting gesture of one or more users. The detection of the gesture operator may be conducted in many ways, such as using one or more cameras, proximity sensors, seat weight sensors, etc. The system checks whether the gesture belongs to a driver or a passenger in step S703. If the gesture belongs to the driver, a pressure sensor of the touch screen is activated while the capacity sensor the touch screen may be kept active, as shown in step S703. If the gesture belongs to the passenger, sensing user's touch operations can be enabled, as shown in step S704. In this example, a device for detecting a user's press gesture action is a pressure sensor, but it is not limited to the pressure sensor. Please note that any sensing device, such as a resistive type of displays, etc., that can accomplish the similar procedure may be used for this purpose.

Figure 8:
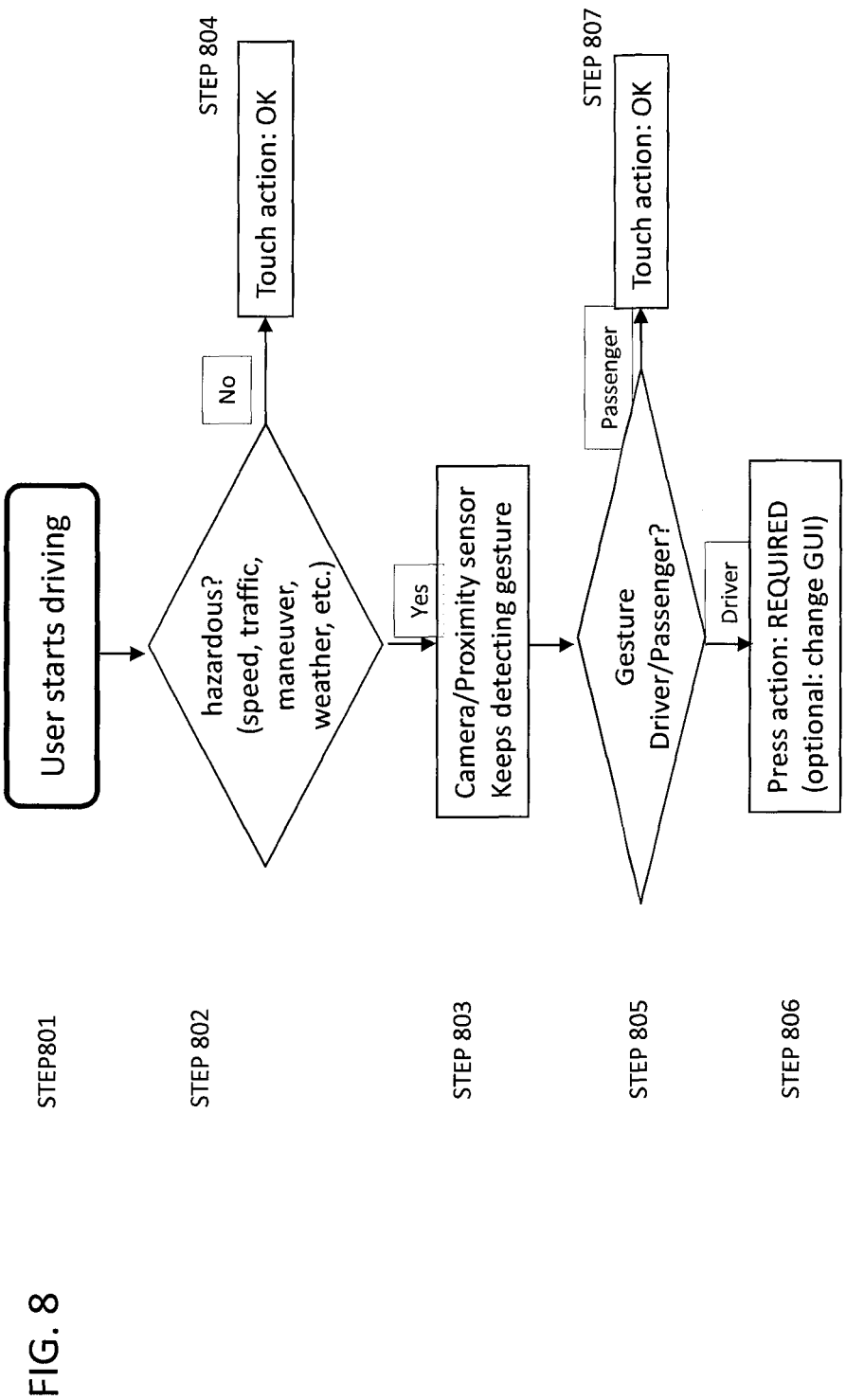
FIG. 8 is a flow chart of providing a touch screen of an infotainment console in a vehicle, according to one embodiment.

FIG. 8 is another sample flow chart of a procedure of the method of operating a console with a touch screen according to one embodiment. In step S801, a user starts driving. In step S802, the system checks whether a current driving situation is hazardous. The current driving situation may be determined by many ways, such as a speed, traffic condition, approaching a maneuver to be soon made as predicted by a navigation program, complexity of the maneuver, a weather condition, etc. If the current driving situation is determined not hazardous, the capacitive touch sensor is kept active and touch operations can be accepted by the infotainment console as in step S804. If the current driving situation is determined hazardous, one or more sensors may start detecting gesture of one or more users as shown in step S803. The detection of the gesture operator may be conducted in many ways, such as using one or more cameras, proximity sensors, seat weight sensors, etc. The system checks whether the gesture belongs to a driver or a passenger in step S805. If the gesture belongs to the driver, a pressure sensor of the touch screen is activated along with the capacitive touch sensor the touch screen, as shown in step S806. If the gesture belongs to the passenger, the capacitive touch sensor may be enabled for sensing user's touch operations, as shown in step S807.

In this example, a device for detecting a user's press gesture action may be a pressure sensor with a capacitive touch sensor, and a device for detecting a user's touch gesture action may be the capacitive sensor. However, it is not limited to this combination of sensors. Please note that any combination of sensors that can accomplish the similar procedure may be used for this purpose. For example, a layered capacitive screen and resistive screen structure may achieve the same effect, by accepting touch-based gesture actions at the capacitive layer and by accepting press-based gesture actions at the resistive layer. In this case, it is not necessary to keep the capacitive layer active while the structure is expecting press-based gesture actions only which can be detected by the resistive layer.

Although this invention has been disclosed in the context of certain preferred embodiments and examples, it will be understood by those skilled in the art that the inventions extend beyond the specifically disclosed embodiments to other alternative embodiments and/or uses of the inventions and obvious modifications and equivalents thereof. In addition, other modifications which are within the scope of this invention will be readily apparent to those of skill in the art based on this disclosure. It is also contemplated that various combination or sub-combination of the specific features and aspects of the embodiments may be made and still fall within the scope of the inventions. It should be understood that various features and aspects of the disclosed embodiments can be combined with or substituted for one another in order to form varying mode of the disclosed invention. Thus, it is intended that the scope of at least some of the present invention herein disclosed should not be limited by the particular disclosed embodiments described above.

The invention claimed is:

1. An infotainment system in a vehicle comprising: a central processing unit; one or more memory units; a console comprising: a touch screen comprising; a screen; a first sensor integrally attached to the screen and configured to receive a touching operation of a user; and a second sensor attached to the screen and configured to receive a pressing operation of the user; and a graphical user interface module configured to process display contents and to instruct the screen to display the display contents, wherein the central processing unit is configured to determine whether to activate either the first sensor or the second sensor or both in order to receive an entry from a user, wherein the central processing unit is configured to display contents according to the determined one or more sensors, to activate the determined one or more sensors, and to receive the entry from the user at the activated one or more sensors; wherein the central processing unit is configured to determine whether a current driving situation is hazardous, and wherein the central processing unit is configured to enable the second sensor and to determine that the entry is valid when the second sensor receives the press operation on the entry, if the current driving situation is determined hazardous.

2. The infotainment system of claim 1,
wherein the central processing unit is configured to determine whether the vehicle is in motion by a status of one of a vehicle speed, a gear selector's position, a parking brake, an angle of a steering wheel, and an engine on/off status, and
wherein the central processing unit is configured to determine that the current driving situation is hazardous when the central processing unit determines that the vehicle is in motion.

3. The infotainment system of claim 1,
wherein the central processing unit is configured to execute a navigation program and to predict whether the vehicle is approaching a next maneuver within a predetermined time or distance, and
wherein the central processing unit is configured to determine that the current driving situation is hazardous when the central processing unit predicts that the vehicle is approaching the next maneuver within the predetermined time or distance.

4. The infotainment system of claim 3,
wherein the central processing unit is further configured to predict a degree of complexity of the maneuver, and
wherein the central processing unit is configured to adjust the predetermined time and distance according to the degree the complexity of the maneuver.

5. The infotainment system of claim 1, further comprising:
one or more third sensors configured to detect whether a body part is approaching the touch screen, wherein the central processing unit is configured to determine whether the body part belongs to a driver using a result of detection by the one or more third sensors, when the one or more third sensor detects that the body part is approaching the touch screen, and wherein the central processing unit is configured to enable the second sensor and to determine that the entry is valid when the second sensor receives the press operation at the entry, if the central processing unit determines that the body part belongs to the driver.

6. The infotainment system of claim 5,
wherein the one or more third sensors are proximity sensors.

7. The infotainment system of claim 5,
wherein the one or more third sensors are cameras.

8. The infotainment system of claim 1,
wherein the touch screen comprises a first region and a second region,
wherein the first region is configured to accept a touching operation as the user entry,
wherein the second region is configured to accept a pressing operation as the user entry, and
wherein the touch screen is configured to display the first region and the second region in graphically different manners.

9. The infotainment system of claim 8,
wherein the touch screen is configured to display the second region comprising one or more buttons indicative that they accept pressing operations of the user.

10. A method for operating a console with a touch screen of an infotainment system in a vehicle, the method comprising: determining whether to activate either the first sensor for receiving a touching operation or the second sensor for receiving a pressing operation or both in order to receive an entry from a user; processing display contents according to the determined one or more sensors; activating the determined one or more sensors; instructing the touch screen to display the display contents; receiving the entry from the user at the activated one or more sensors; determining whether a current driving situation is hazardous; enabling the second sensor, if the current driving situation is determined hazardous; and determining that the entry is valid when the second sensor receives the press operation on the entry, if the current driving situation is determined hazardous.

11. The method for operating the console with a touch screen of the infotainment system in the vehicle of claim 10, further comprising:
determining whether the vehicle is in motion by a status of one of a vehicle speed, a gear selector's position, a parking brake, an angle of a steering wheel, and an engine on/off status; and
determining that the current driving situation is hazardous when it is determined that the vehicle is in motion.

12. The method for operating the console with a touch screen of the infotainment system in the vehicle of claim 10, further comprising:
executing a navigation program;
predicting whether the vehicle is approaching a next maneuver within a predetermined time or distance; and
determining that the current driving situation is hazardous when the vehicle is predicted to be approaching the next maneuver within the predetermined time or distance.

13. The method for operating the console with a touch screen of the infotainment system in the vehicle of claim 12, further comprising:
predicting a degree of complexity of the maneuver; and
adjusting the predetermined time and distance according to the degree the complexity of the maneuver.

14. The method for operating the console with a touch screen of the infotainment system in the vehicle of claim 10, further comprising:
detecting whether a body part is approaching the touch screen by one or more third sensors;
determining whether the body part belongs to a driver using a result of detection by the one or more third sensors, when the one or more third sensor detects that the body part is approaching the touch screen;
enabling the second sensor, if it is determined that the body part belongs to the driver; and
determining that the entry is valid when the second sensor receives the press operation at the entry, if it is determined that the body part belongs to the driver.

15. The method for operating the console with a touch screen of the infotainment system in the vehicle of claim 14,
wherein the one or more third sensors are proximity sensors.

16. The method for operating the console with a touch screen of the infotainment system in the vehicle of claim 14,
wherein the one or more third sensors are cameras.

17. The method for operating the console with a touch screen of the infotainment system in the vehicle of claim 10, the touch screen comprising a first region and a second region, the method further comprising:
accepting a touching operation as the user entry at the first region;
accepting a pressing operation as the user entry at the second region, and
wherein the touch screen is configured to display the first region and the second region in graphically different manners.

18. The method for operating the console with a touch screen of the infotainment system in the vehicle of claim 17,
wherein the touch screen is configured to display the second region comprising one or more buttons indicative that they accept pressing operations of the user.

* * * * *

UNITED STATES PATENT AND TRADEMARK OFFICE
CERTIFICATE OF CORRECTION

PATENT NO. : 9,703,472 B2  
APPLICATION NO. : 14/661967  
DATED : July 11, 2017  
INVENTOR(S) : Hikaru Wako Page 1 of 1

It is certified that error appears in the above-identified patent and that said Letters Patent is hereby corrected as shown below:

On the Title Page

Please change:  
(72) Inventor: Hikaru P. Wako, Torrance, CA (US)

To:  
(72) Inventor: Hikaru Wako, Torrance, CA (US)

Signed and Sealed this  
Third Day of October, 2017

Joseph Matal  
*Performing the Functions and Duties of the*  
*Under Secretary of Commerce for Intellectual Property and*  
*Director of the United States Patent and Trademark Office*